Sept. 12, 1961   F. G. REUTER ET AL   2,999,717
RESILIENT RAILWAY WHEEL
Filed Feb. 21, 1958

INVENTOR:
Franz Gottfried Reuter
Robert Igelbrinck
By Clelle W. Upchurch
ATTORNEY.

United States Patent Office 2,999,717
Patented Sept. 12, 1961

2,999,717
RESILIENT RAILWAY WHEEL
Franz G. Reuter, Lemforde, Hannover, and Robert Igelbrinck, Voxtrup, Osnabruck, Germany, assignors, by mesne assignments, to Mobay Chemical Company, Pittsburgh, Pa., a corporation of Delaware
Filed Feb. 21, 1958, Ser. No. 716,674
Claims priority, application Germany Feb. 25, 1957
1 Claim. (Cl. 295—11)

This invention relates generally to disc wheels for vehicles and more particularly to disc wheels for rail vehicles and to a method for making the same.

The heretofore available disc wheels for rail cars and the like have a separate wheel disc in the form of a circular flange welded to the hub body or such wheels have a V-shaped felly. It has been necessary to provide a split felly for such wheels and to later weld the two parts together. The resulting wheel having the riveted or welded joints has not been entirely satisfactory because the welded joints are not as strong as a one-piece felly would be. The wheel therefore can not withstand the fatiguing loads required of them for an extended period of time.

It is, therefore, an object of this invention to provide an improved disc wheel for rail vehicles. Another object of the invention is to provide a method for making a disc wheel having a one-piece felly. Still another object of the invention is to provide a disc wheel of novel construction having improved fatigue characteristics and capable of withstanding the loads encountered in rail transportation.

Figure 1:
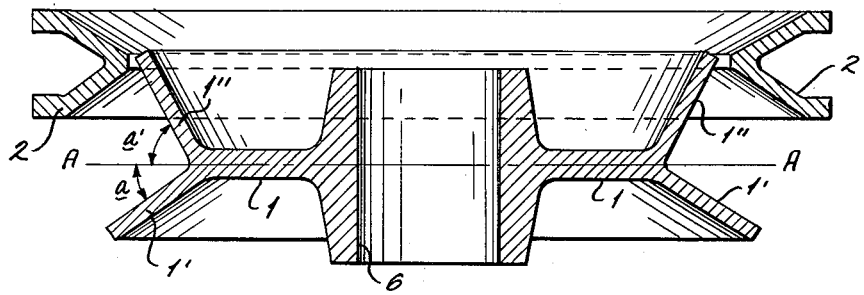
Figure 2:
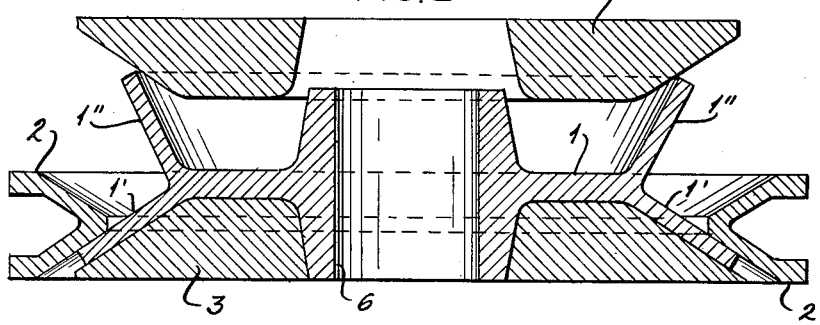
Figure 3:
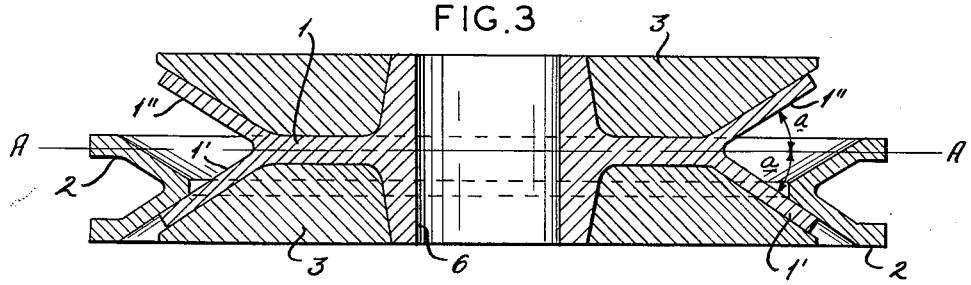
Figure 4:
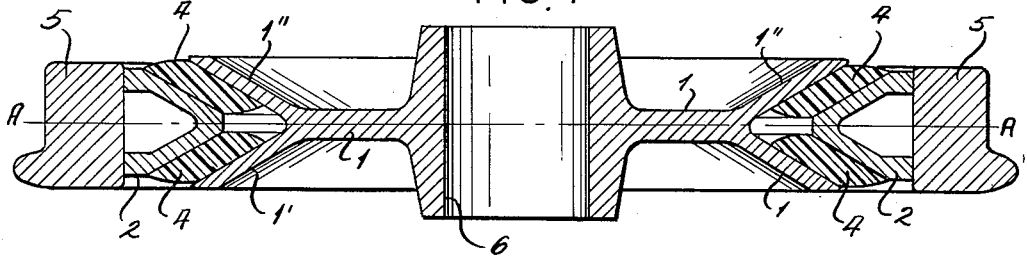

Other objects will become apparent from the following description with reference to the accompanying drawing in which FIGURE 1 is a plan view, partially in section, of the parts used to prepare an embodiment of this invention; and FIGURE 2 is a section showing the parts of the embodiment of FIGURE 1 in partially assembled position; and FIGURE 3 is another sectional view of the parts assembled together just prior to casting of a synthetic resin insert; and FIGURE 4 is a sectional view of one-half of the wheel provided by this invention.

Generally speaking, the foregoing objects as well as others are accomplished in accordance with this invention by providing a disc wheel assembled from a wheel body and a one-piece felly. The felly is held in position with a synthetic resin insert cast thereabout. More specifically, the invention provides a method for making a wheel for vehicles having a one-piece felly and a flexible polyurethane resin insert about the felly.

Referring now to the drawing, FIGURE 1 illustrates a disc wheel body as it appears after it has been formed by rolling or pressing. The left leg 1' of the V-shaped rim of body 1 has been shaped to have the correct angle alpha. The right leg 1", however, does not slope from the center at the angle desired in the finished product. The angle alpha is greater than it will be in the finished product and leg 1" does not extend as high as leg 1'. As shown in FIGURE 1, leg 1" is at such a height that felly 2 can slide over it and into the V of the rim between legs 1' and 1". After the felly 2 has been passed over leg 1", leg 1' is pressed inwardly by means of a die towards the axis A—A as shown in FIGURE 2. The wheel body 1 may be heated and hot pressed, if necessary. Leg 1' is supported by means of a die as leg 1" is moved inwardly to the correct angle by means of die 3.

FIGURE 3 illustrates the die-forming operation with leg 1" joined to the correct angle alpha.

After the felly 2 has been moved into the proper position between legs 1' and 1", a supporting plastic insert is cast about felly 2 and in between legs 1' and 1". This is done with the assembly in a horizontal position. This plastic insert is a cast substantially non-porous rubber-like polyurethane plastic. In casting the insert about felly 2, felly 2 is moved horizontal towards either leg 1' or leg 1" so that its center line is eccentric with the axis A—A of the wheel body. The cavity lying between felly 2 and the leg farthest away from it is then filled with substantially non-porous rubber-like polyurethane plastic. The proper position of felly 2 for this step is shown in FIGURE 3. The wheel is now turned over and while in a horizontal position, felly 2 is moved as far as it can be towards that leg of wheel body 1 adjacent the polyurethane insert. This compresses the insert. While the felly is in this position, a second polyurethane insert is cast on the upper side of felly 2, thereby providing an insert on each side of felly 2 between legs 1' and legs 1". The plastic is then permitted to cure or age and the finished wheel is obtained by inserting the wheel body and felly 2 in a suitable rim. One-half of a finished wheel is illustrated in FIGURE 4. This wheel has hub 6, body 1 with legs 1' and 1" containing polyurethane inserts 4 and felly 2. Rim 5 rests on the upper surfaces of felly 2.

The two inserts 4 are exercising substantially the same force against felly 2 and thereby hold it in a centered position between legs 1' and 1". The felly carries wheel rim 5. The resulting wheel has an extremely high side stability as a result of the V profile of the felly extending between the two legs 1' and 1".

The wheel body and felly may be shaped from any suitable material. It is preferred, however, to use iron castings.

The plastic inserts are cast substantially non-porous rubber-like polyurethane. Any suitable polyurethane of this type may be used including those disclosed in U.S. Patents 2,729,618, 2,621,166 and 2,620,516. Any of the various organic polyisocyanate and organic compounds having hydrogen atoms reactive with NCO groups may be used in preparing the polyurethane. Any of the cross-linkers disclosed in these patents including ethylene glycol, diethylene glycol, propylene glycol or the like may be used. Examples of suitable organic polyisocyanate include toluylene diisocyanate, p-phenylene diisocyanate, 1,5 naphthylene diisocyanate and the like. Suitable organic compounds having reactive hydrogen atoms include polyesters having terminal hydroxyl groups prepared by esterification of a dicarboxylic acid and a glycol, a polyalkylene ether glycol prepared by condensation of an alkylene oxide such as for example, ethylene oxide, propylene oxide, butylene oxide or the like. The polyurethanes prepared in accordance with the examples of the aforesaid patents or the examples for making substantially non-porous polyurethanes in U.S. Patent 2,764,565 may be used. The polyurethane is cast about the felly by pouring it into the cavity between the felly and the leg of the wheel body and may be cured by heating at a temperature of about 100° C. or higher for up to 24 hours.

Preferably, the polyurethane must have a shore A hardness of from about 50 to about 75° and an elasticity of from about 35% to about 65%.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claim.

What is claimed is:

A disc wheel for rail vehicle comprising a one-piece hub and body, said body having a V-shaped edge spaced from said hub having an open radially outer end, a one-piece open V-shaped felly lying within said V-shaped edge with its apex nearest the hub, the inside diameter of the felly being substantially smaller than the outside diameter of the hub and body, a rubber-like polyurethane plastic insert between said edge and felly, and a separate rim mounted on the open base of said V-shaped felly.

References Cited in the file of this patent

UNITED STATES PATENTS

| | | |
|---|---|---|
| 220,221 | Cooper | Oct. 7, 1879 |
| 623,883 | Cameron | Apr. 25, 1899 |
| 899,648 | Baker | Sept. 29, 1908 |
| 1,700,003 | Watrous | Jan. 22, 1929 |
| 2,245,456 | Blowser | June 10, 1941 |
| 2,320,163 | Anderson | May 25, 1943 |
| 2,749,960 | Schwartz | June 12, 1956 |
| 2,954,259 | Kordes | Sept. 27, 1960 |